(12) United States Patent
Fu et al.

(10) Patent No.: US 7,046,473 B2
(45) Date of Patent: May 16, 2006

(54) METHOD AND APPARATUS FOR ACTIVE FLY HEIGHT CONTROL WITH HEATING AND ELECTRICAL CHARGE

(75) Inventors: Yen Fu, San Jose, CA (US); Ellis T. Cha, San Ramon, CA (US); Zhu Feng, Pleasanton, CA (US)

(73) Assignee: SAE Magnetics (H.K.) Ltd., Shatin (HK)

( * ) Notice: Subject to any disclaimer, the term of this patent is extended or adjusted under 35 U.S.C. 154(b) by 0 days.

(21) Appl. No.: 10/941,420

(22) Filed: Sep. 14, 2004

(65) Prior Publication Data

US 2006/0056094 A1  Mar. 16, 2006

(51) Int. Cl.
*G11B 21/02* (2006.01)
(52) U.S. Cl. .................... 360/75; 360/234.4
(58) Field of Classification Search .............. None
See application file for complete search history.

(56) References Cited

U.S. PATENT DOCUMENTS

| | | | | |
|---|---|---|---|---|
| 5,991,113 A | | 11/1999 | Meyer et al. ............ 360/75 |
| 6,359,746 B1 | * | 3/2002 | Kakekado et al. ........ 360/75 |
| 6,577,466 B1 | | 6/2003 | Meyer et al. ............ 360/75 |
| 2002/0191326 A1 | * | 12/2002 | Xu et al. ............... 360/75 |
| 2003/0174430 A1 | * | 9/2003 | Takahashi et al. ........ 360/75 |
| 2005/0007687 A1 | * | 1/2005 | Feng et al. ............. 360/75 |
| 2005/0057841 A1 | * | 3/2005 | Stover et al. ........... 360/59 |
| 2005/0105204 A1 | * | 5/2005 | Bloodworth et al. ..... 360/75 |

* cited by examiner

*Primary Examiner*—Andrew L. Sniezek
(74) *Attorney, Agent, or Firm*—Kenyon & Kenyon LLP

(57) ABSTRACT

A system and method for adjusting the flying height of a magnetic head above a magnetic storage medium, such as a disk, is disclosed. A charging surface of the slider, separate from the read/write head, allows a charging electrical interconnect to apply an electrical charge to the slider. By acting as a quasi-parallel capacitor, the amount of spacing in the head-disk interface may be increased or decreased based on the amount of voltage applied. The slider may be electrically isolated from the suspension. Simultaneously, a heating element deforms the slider to further adjust the spacing between the read/write head and the disk surface. A feedback control system may monitor and control the head-disk spacing by measuring a temperature or other environmental conditions surrounding the slider and disk.

18 Claims, 4 Drawing Sheets

METHOD AND APPARATUS FOR ACTIVE FLY HEIGHT CONTROL WITH HEATING AND ELECTRICAL CHARGE

BACKGROUND INFORMATION

The present invention relates to magnetic hard disk drives. More specifically, the present invention relates to a method of adjusting the spacing between the recording heads and the magnetic storage media.

FIG. 1 illustrates a hard disk drive design typical in the art. Hard disk drives 100 are common information storage devices consisting essentially of a series of rotatable disks 104 that are accessed by magnetic reading and writing elements. These data transferring elements, commonly known as transducers, are typically carried by and embedded in a slider body 110 that is held in a close relative position over discrete data tracks formed on a disk to permit a read or write operation to be carried out. The slider is held above the disks by a suspension. The suspension has a load beam and flexure allowing for movement in a direction perpendicular to the disk. The suspension is rotated around a pivot by a voice coil motor to provide coarse position adjustments. Sometime, a micro-actuator is used to couple the slider to the end of the suspension and allows fine position adjustments to be made.

The body of the slider is made of electrically conductive material and grounded to prevent charge accumulation during tribological events. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The airflow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. The flying height varies from location to location on the slider surface facing the disk. In addition to the spacing created by air lift from the ABS, the gap at the exposed surface of the transducer, commonly know as pole tip, is also affected by the protrusion or recession above the nominal flying height. Such a protrusion may come from thermal expansion mismatches in the slider body and reduce the flying height of the pole tip of the transducer. As illustrated in FIG. 2, the airflow lifts the slider 202 above the disk 204 to a nominal flying height 206 and the thermal expansion effect 208 causes the pole tip of the read/write element 210 to protrude toward the disk by an additional amount 212. The net spacing 214 between the pole tip and the disk is then equal to the nominal flying height 206 less the additional amount 212. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of light-weight and compact notebook type computers that utilize relatively small yet powerful disk drives, the need for a progressively lower flying height has continually grown.

The physical spacing between the head and the disk is a critical parameter affecting the performance and reliability of the disk drive. When the spacing is reduced, the write and read performance improves and higher recording density can be achieved. On the other hand, the mechanical interaction between the head and the disk increases and reliability of the disk drive degrades. This spacing is dominated by the flying height of the slider and the pole tip protrusion/recession of the write and read transducers. Controls of these factors are important, especially by adaptive or closed-loop control means.

Various exiting methods have been provided for such adaptive or closed-loop controls of the head-disk spacing. A first existing method supplies an electrical current to a heating element in the head to create a thermal deformation which protrudes the head towards the disk, reducing the head-disk spacing. The main limitation of this method is from the degraded reliability of the read transducer when it gets too hot from the amount of heat absorbed from the heating element. A second existing method is to electrically isolate the slider body from ground and apply an electric voltage to the slider body which reduces the fly height from the attraction force. For this implementation, the slider body needs to be electrically connected to an electrical device through one of the interconnects on the suspension. The main limitation of this method is from the electrical discharge between the slider and the disk, damaging the disk when the voltage is too high.

DETAILED DESCRIPTION

A system and method for adjusting the flying height of a magnetic head above a magnetic storage medium, such as a disk, is disclosed. A charging surface of the slider, separate from the read/write head, allows a charging electrical conductor to apply an electrical charge to the slider. By acting as a quasi-parallel capacitor, the amount of spacing in the head-disk interface may be increased or decreased based on the amount of voltage applied. The slider may be electrically isolated from the suspension. Simultaneously, a heating element deforms the pole tip to further adjust the spacing between the read/write head and the disk surface. A feedback control system may monitor and control the head-disk spacing by measuring a temperature or other environmental conditions surrounding the slider and disk.

Figure 1:
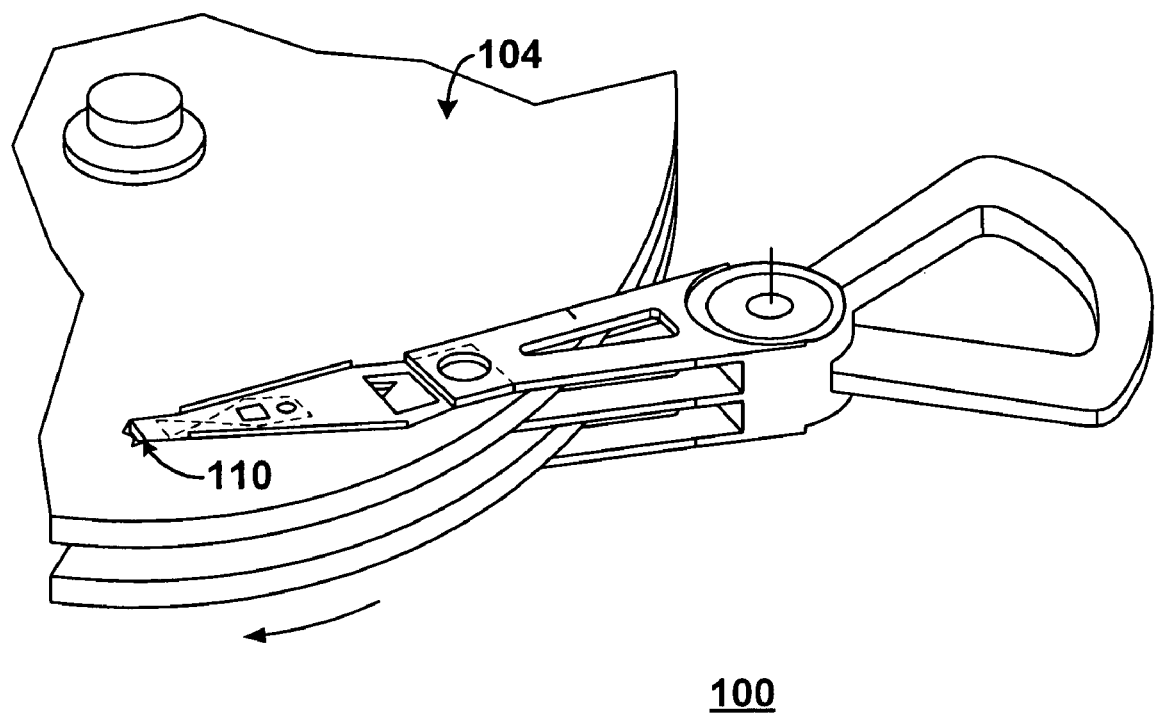
FIG. 1 is a perspective view of a disk drive device that is known in the art.
Figure 2A:
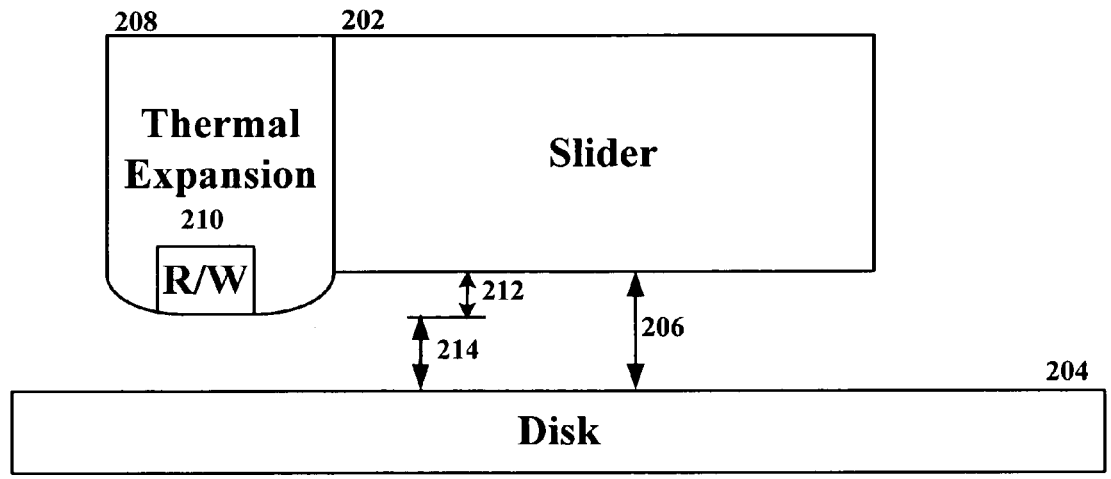
FIGS. 2a–b illustrate one embodiment of the slider and suspension as known in the art.
Figure 2B:
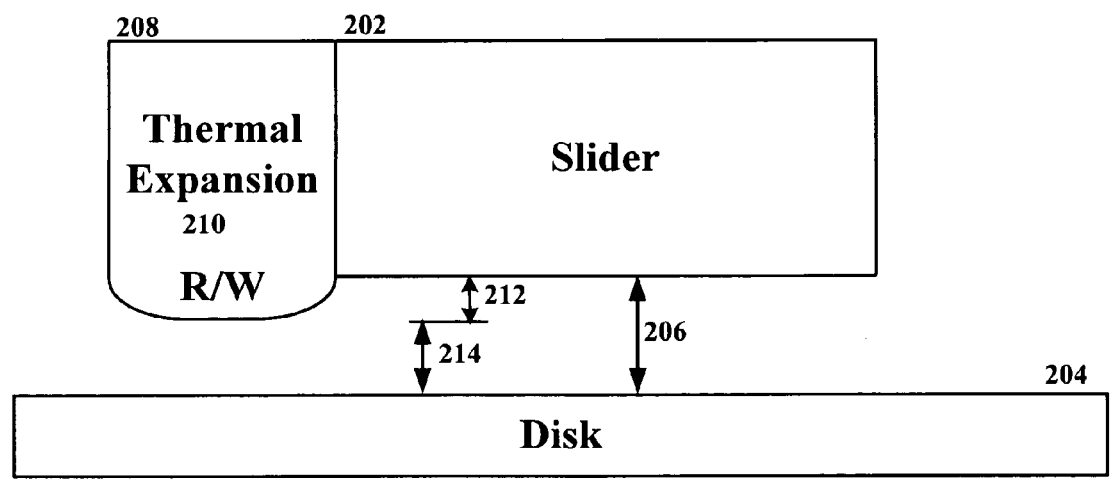
Figure 3:
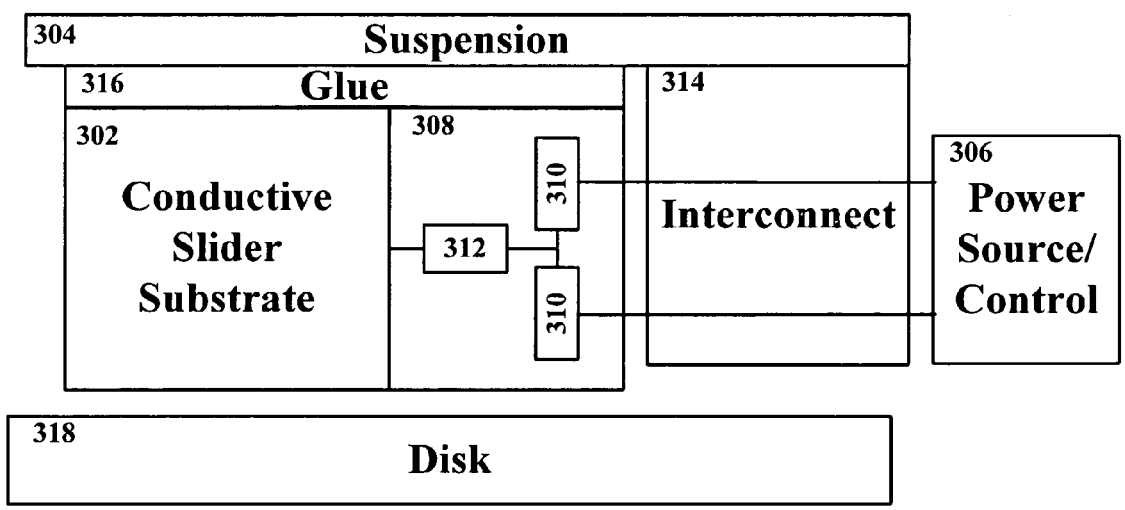
FIG. 3 illustrates one embodiment of the slider with a heater and a charging surface that use a single power source as practiced in the present invention.

FIG. 3 illustrates one embodiment of the slider 302, the suspension 304, and the power supply 306 as practiced in the present invention. The slider 302 may contain a deposited trailing end 308 containing the read/write elements and the heater elements 310. The heater elements 310 may be viewed as resistors. The heater elements 310 may be integrated with the read/write elements or a separate device. The trailing end may also contain a current-limiting ballast 312 that connects the heater elements 310 to the slider body 302. The ballast resistor 312 limits the current flow into the slider body 302 to prevent potential damage to the slider-disk interface. The heater elements 310 may be connected to an electrical power source 306 through an interconnect 314 or series of interconnects on the suspension 304. The slider body 302 may be glued to the suspension 304 with a non-conductive material 316, electrically isolating the slider body 302 from the suspension 304. An electrical current sent from the power source 306 into the trailing end 308 of the slider 302 may simultaneously heat up the heating elements 310 and charge up the slider body 302. The heating elements 312 expand and push the pole tip of the read/write elements to protrude towards the storage disk 318. At the same time, the charged slider body 302 acts as an upper electrode while the disk 318 acts as a lower electrode. An electrostatic field develops between the two electrodes and applies an attraction force to reduce the flying height of the slider body 302 and the pole tip. The magnitude of the electrostatic field depends upon the resistance of the heating elements 310, which acts as a voltage divider. The two heating elements 310 may be made with a pre-determined resistance ratio to act as a voltage divider to set the amount of charge in the slider body 302 to a desired level. The resistance designed into each of the heating elements 310 may thus control the electrostatic field. When the power source 306 is turned off, current stops flowing, the heating elements 310 cool off, the charge on the slider body 302 drains into the ground through the heating elements 310, and the pole tip flying height returns to its original level. So, whenever a reduced pole tip flying height is desired, such as during the read/write mode, the power source may be turned on until no longer needed, such as during track seeking mode. In this embodiment, only one power source is used to drive both heating and charging mechanisms, which get turned on and off together in synchronized mode. The power source may also have a feedback control system built in to monitor and control the head-disk spacing by measuring a temperature or other environmental conditions surrounding the slider and disk.

Figure 4:
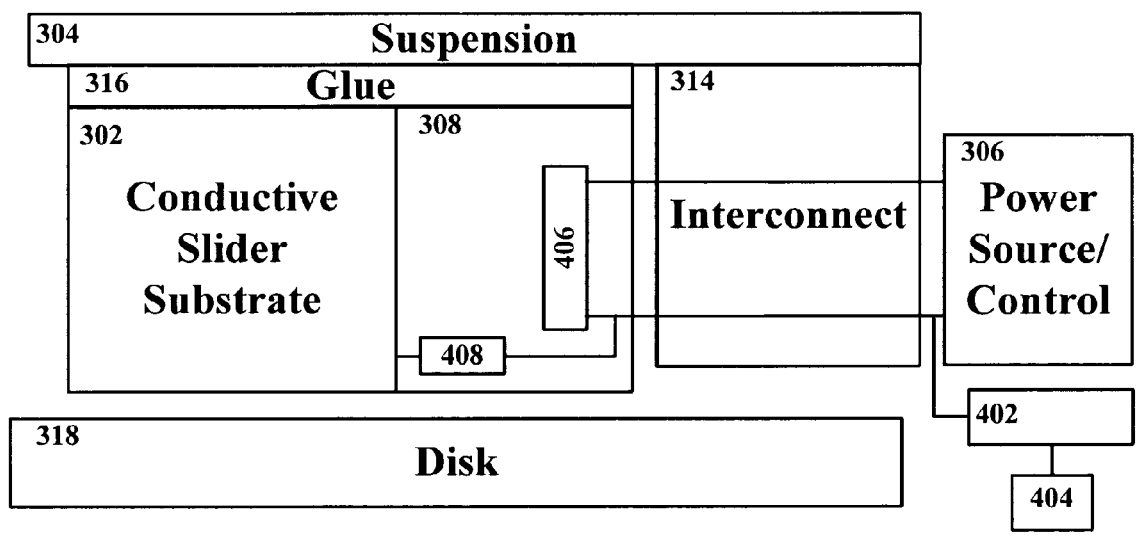
FIG. 4 illustrates one embodiment of the slider with a heater and a charging surface that use two separate power sources as practiced in the present invention.

FIG. 4 illustrates another embodiment of the adjustable flying height slider 302 with multiple power supplies. A separate power supply 402 may charge the slider body 302 to an elevated electrostatic potential. This separate power supply 402 may be connected to ground 404 and may be an adjustable voltage source. The separate power supply 402 provides independent control of the electrostatic potential of the slider body 302 separate from the power supply 306 for the heating element 406. A ballast 408 may be used to limit the speed of charging or discharging of the slider body. Thus, the flying height due to electrostatic charge may be controlled separately from the pole-tip protrusion due to the heating mechanism. Further, the response time of the electrostatic charging mechanism is usually much shorter than the heating mechanism.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A slider, comprising:
    a read/write head having a set of read elements to read data from a data storage medium and a set of write elements to write data to the data storage medium across a spacing between the slider and the data storage medium;
    a charging surface to produce a voltage on the slider to adjust the spacing between the read/write head and the data storage medium; and
    a heating element to produce mechanical deformation of the slider to adjust the spacing between the read/write head and the data storage medium, the heating element to control the voltage produced by the charging surface.

2. The slider of claim 1, wherein a single power source provides a voltage to the charging surface and a current to the heating element.

3. The slider of claim 1, wherein separate power sources provide a voltage to the charging surface and a current to the heating element.

4. The slider of claim 1, wherein the heating element is separate from the set of read elements and the set of write elements.

5. The slider of claim 1, wherein the heating element is integrated into the set of read elements and the set of write elements.

6. The slider of claim 1, wherein the charging surface and the heating element are controlled by a feedback control system.

7. A disk drive, comprising:
    a slider with a read/write head having a set of read elements to read data and a set of write elements to write data, a charging surface to produce a voltage on the slider, and a heating element to both control the voltage produced by the charging surface and to produce mechanical deformation of the slider;
    a disk to store data;
    a suspension to support the slider and maintain a spacing between the slider and the disk; and
    a control circuit to control a current applied to the heating element and a voltage applied to the charging surface to adjust the spacing between the slider and the disk.

8. The disk drive of claim 7, wherein a single power source provides a voltage to the charging surface and a current to the heating element.

9. The disk drive of claim 7, wherein separate power sources provide a voltage to the charging surface and a current to the heating element.

10. The disk drive of claim 7, wherein the heating element is separate from the set of read elements and the set of write elements.

11. The disk drive of claim 7, wherein the heating element is integrated into the set of read elements and the set of write elements.

12. The disk drive of claim 7, wherein the control circuit is a feedback control system built into the power source.

13. A method, comprising:
    suspending a slider with a read/write head over a data storage medium;
    maintaining a spacing between the slider and the data storage medium;
    producing a voltage on a charging surface of the slider to adjust the spacing between the slider and the data storage medium; and
    heating a heating element of the slider to both control the voltage produced by the charging surface and to produce mechanical deformation of the slider to adjust the spacing between the slider and the data storage medium.

14. The method of claim 13, wherein the heating element is separate from the set of read elements and the set of write elements.

15. The method of claim 13, wherein the heating element is integrated into the set of read elements and the set of write elements.

16. The method of claim 13, further comprising controlling the charging surface and the heating element by using a closed loop measurement and control circuit.

17. The method of claim 13, further comprising using a single power source to provide a voltage to the charging surface and a current to the heating element.

18. The method of claim 13, further comprising using separate power sources to provide a voltage to the charging surface and a current to the heating element.

* * * * *